United States Patent
Peleg et al.

(10) Patent No.: US 9,881,044 B2
(45) Date of Patent: Jan. 30, 2018

(54) TECHNIQUES FOR ENSURING CONSISTENCY OF DATA UPDATES TRANSACTIONS IN A DISTRIBUTED STORAGE SYSTEM

(71) Applicant: Reduxio Systems LTD., Petach Tiqva (IL)

(72) Inventors: Nir Peleg, Beer Yaakov (IL); Or Sagi, Tel Aviv (IL)

(73) Assignee: Reduxio Systems Ltd., Petah Tiqwa (IL)

( * ) Notice: Subject to any disclaimer, the term of this patent is extended or adjusted under 35 U.S.C. 154(b) by 344 days.

(21) Appl. No.: 14/586,391

(22) Filed: Dec. 30, 2014

(65) Prior Publication Data

US 2015/0186450 A1 Jul. 2, 2015

Related U.S. Application Data

(60) Provisional application No. 61/922,109, filed on Dec. 31, 2013.

(51) Int. Cl.
*G06F 7/00* (2006.01)
*G06F 17/00* (2006.01)
(Continued)

(52) U.S. Cl.
CPC ........ *G06F 17/30371* (2013.01); *G06F 3/067* (2013.01); *G06F 3/0619* (2013.01); *G06F 3/0659* (2013.01); *G06F 9/466* (2013.01)

(58) Field of Classification Search
CPC .. G06F 17/30371; G06F 9/466; G06F 3/0619; G06F 3/0659; G06F 3/067
(Continued)

(56) References Cited

U.S. PATENT DOCUMENTS

| 7,103,619 B1 | 9/2006 | Rajpurkar et al. |
| 7,328,213 B2 | 2/2008 | Suzuki et al. |

(Continued)

FOREIGN PATENT DOCUMENTS

EP 2073120 A1 6/2009

OTHER PUBLICATIONS

The International Search Report and the Written Opinion of the International Search Authority for PCT/US2014/072786, ISA/RU, Moscow, Russia, dated Jun. 10, 2015.

*Primary Examiner* — Kris Mackes
*Assistant Examiner* — Lin Lin Htay
(74) *Attorney, Agent, or Firm* — Pearl Cohen Zedek Latzer Baratz LLP

(57) ABSTRACT

A method and system for ensuring consistency in data updates transactions in a distributed storage system (DSS) are provided. The method includes receiving an aggregated transaction request comprising monotonous transaction requests, wherein each monotonous transaction request is initiated by at least one computing node of a plurality of computing of nodes in the DSS, wherein the root computing node and the plurality of computing nodes are arranged in a tree structure; generating a range of transaction indexes based on the aggregated transaction request; and passing the generated range of transaction indexes along the plurality of computing nodes according to their respective level in the tree structure hierarchy, wherein each of the plurality of computing nodes initiating the monotonous transaction request is allocated with a unique portion of the aggregated transaction indexes, thereby ensuring time-order access to at least one storage device in the DSS.

13 Claims, 5 Drawing Sheets

(51) Int. Cl.
   *G06F 17/30* (2006.01)
   *G06F 9/46* (2006.01)
   *G06F 3/06* (2006.01)

(58) Field of Classification Search
   USPC .......................................................... 707/690
   See application file for complete search history.

(56) References Cited

U.S. PATENT DOCUMENTS

| | | | |
|---|---|---|---|
| 8,140,498 B2 | 3/2012 | Nishiyama | |
| 8,170,997 B2 | 5/2012 | Lomet et al. | |
| 2004/0267747 A1 | 12/2004 | Choi et al. | |
| 2005/0080796 A1* | 4/2005 | Midgley | G06F 17/30067 |
| 2007/0027999 A1 | 2/2007 | Allen et al. | |
| 2007/0028068 A1 | 2/2007 | Golding et al. | |
| 2010/0070473 A1* | 3/2010 | Swett | G06F 17/30575 |
| | | | 707/622 |
| 2012/0047221 A1 | 2/2012 | Georgiev | |
| 2012/0278293 A1* | 11/2012 | Bulkowski | G06F 17/30575 |
| | | | 707/703 |
| 2013/0086419 A1 | 4/2013 | Little et al. | |
| 2013/0198868 A1 | 8/2013 | Georgiev | |
| 2013/0332484 A1* | 12/2013 | Gajic | G06F 17/30286 |
| | | | 707/770 |
| 2014/0330767 A1* | 11/2014 | Fowler | G06F 9/466 |
| | | | 707/607 |

* cited by examiner

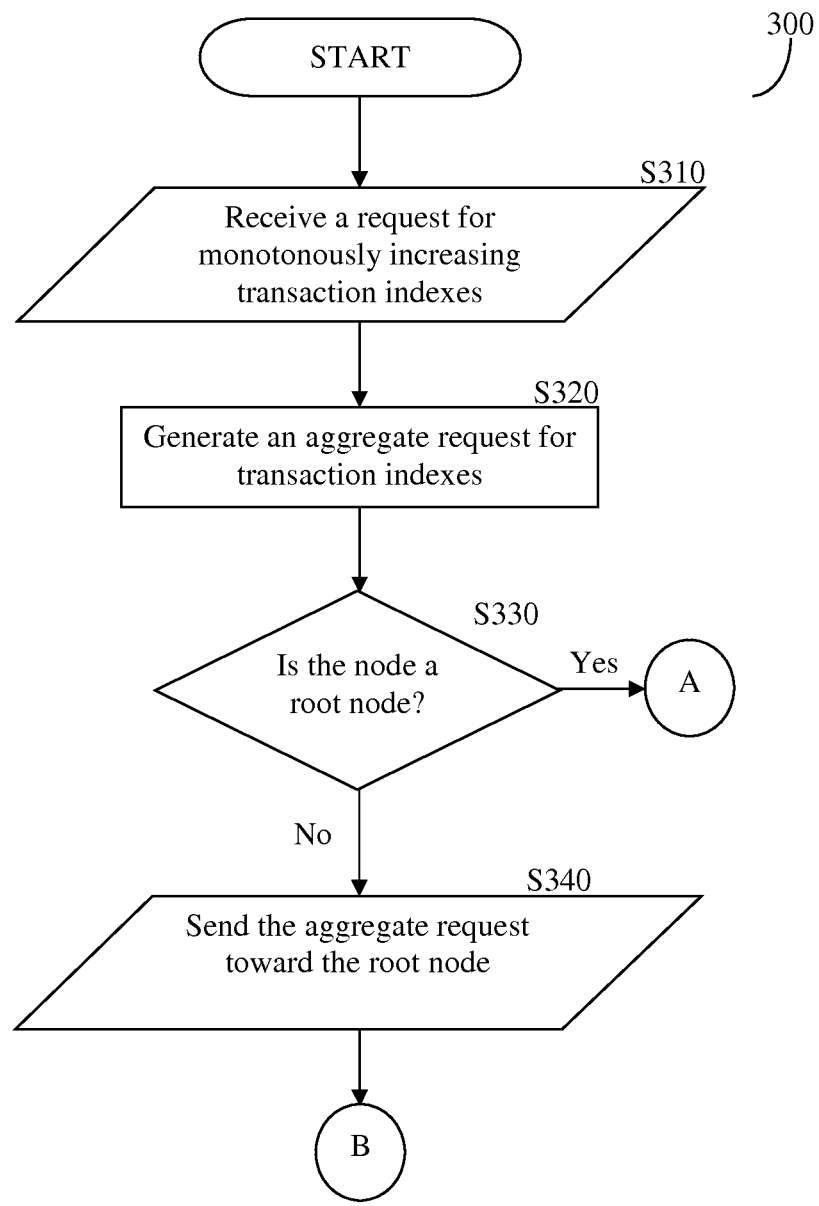
FIGURE 3 (Part A)

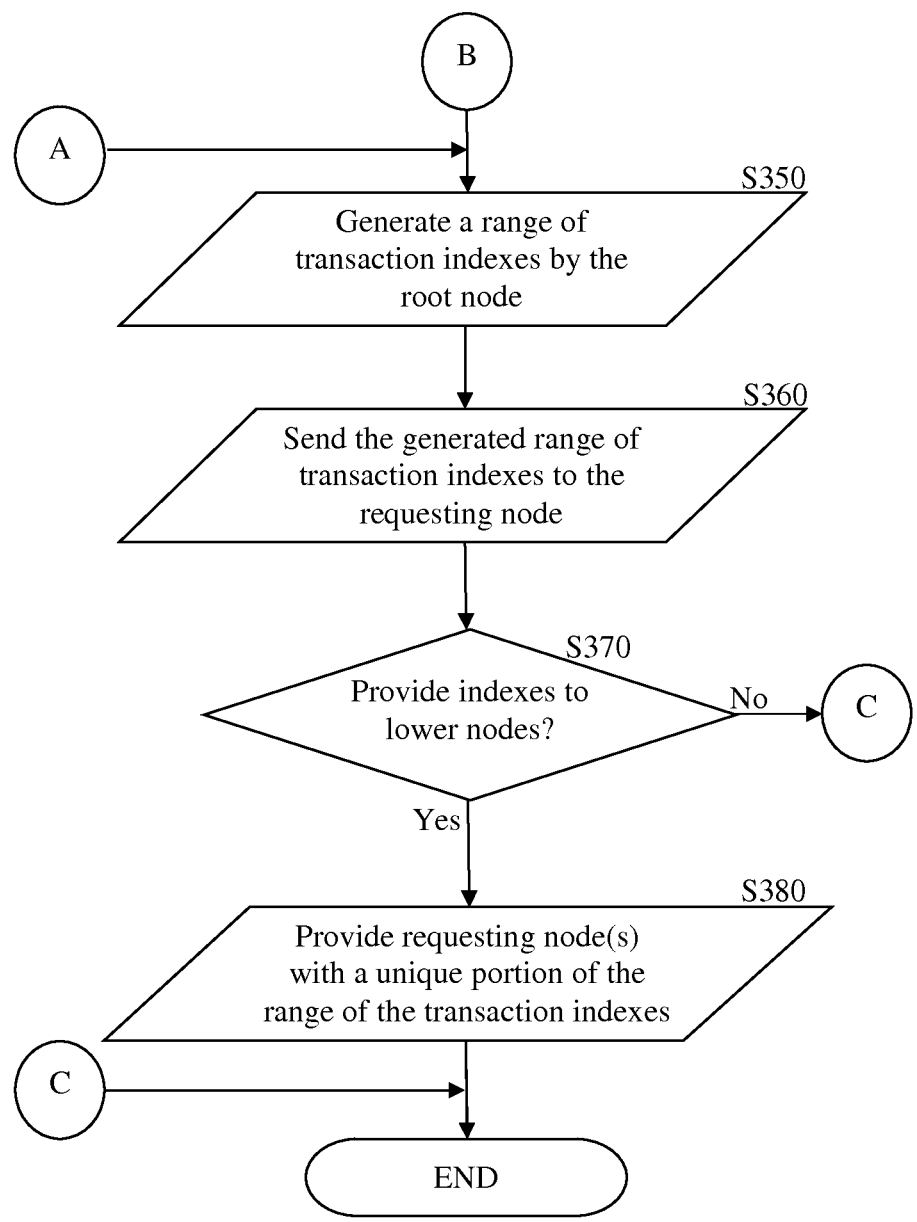
FIGURE 3 (Part B)

TECHNIQUES FOR ENSURING CONSISTENCY OF DATA UPDATES TRANSACTIONS IN A DISTRIBUTED STORAGE SYSTEM

CROSS REFERENCE TO RELATED APPLICATIONS

This application claims the benefit of U.S. provisional application No. 61/922,109 filed on Dec. 31, 2013, the contents of which are herein incorporated by reference.

TECHNICAL FIELD

The disclosure generally relates to managing a data storage system, and more particularly for management of consistency in the transactions performed by nodes when accessing storage devices in a distributed storage system (DSS).

BACKGROUND

In data storage systems, a transaction is a sequence of data update operations that should be all completed with respect to a given node. When some data updates are invalid, the transaction cannot be completed, and as such can be aborted. In a distributed storage system (DSS), data update transactions may be initiated by distinct computing nodes on storage devices.

A data update operation in the DSS typically requires a protocol, implemented and controlled by a dedicated centralized node or a coordinator. The coordinator communicates with the other nodes operable in the DSS. Setting one node to operate as a coordinator typically ensures a valid execution of the sequence of data update operations. The selection of the coordinator may be based on an arbitrary selection, a policy of the operating system (OS) of the nodes, a user configuration.

The related art discusses several techniques to ensure a valid execution of a transaction. One of such techniques is based on a two-phase commit (2PC) protocol. This type of protocol identifies by the coordinator whether the rest of the nodes in the DSS can perform a required update operation. When the coordinator receives confirmations from all of the nodes, the coordinator decides to commit the transactions and the transaction is then committed by each node in the DSS. Otherwise the transaction is aborted (upon receiving confirmation from only a portion of the nodes).

Utilization of the coordinator and 2PC protocol does not ensure a complete of execution of transactions. For example, when two transactions are executed at the same time, each of which attempting to update the same data, the sequence of data update operations may be failed. Another disadvantage for utilizing the coordinator and 2PC protocol is that the order of data update operation is not maintained. As such, a problem may arise when that update operation failed on one node designated in the transaction. This may lead to data loss. As the order of update operation is not maintained, the failed operation cannot be easily recovered.

It would therefore be advantageous to provide a technical solution that overcomes the deficiencies of the prior art.

SUMMARY

A summary of several example aspects of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all aspects nor delineate the scope of any or all aspects. Its sole purpose is to present some concepts of one or more embodiments in a simplified form as a prelude to the more detailed description that is presented later. For convenience, the term some embodiments may be used herein to refer to a single embodiment or multiple embodiments of the disclosure.

Certain exemplary embodiments disclose a method for ensuring consistency in data updates transactions in a distributed storage system (DSS). The method comprises receiving, at a root computing node in the DSS, an aggregated transaction request comprising monotonous transaction requests, wherein each monotonous transaction request is initiated by at least one computing node of a plurality of computing of nodes in the DSS and includes monotonously increasing transaction indexes requested by the at least one computing node, wherein the root computing node and the plurality of computing nodes are arranged in a tree structure; generating a range of transaction indexes based on the aggregated transaction request, wherein each of the transaction indexes determines a time-order access to at least one storage device in the DSS by the at least one computing node of the plurality of computing nodes; and passing the generated range of transaction indexes along the plurality of computing nodes according to their respective level in the tree structure hierarchy, wherein each of the plurality of computing nodes initiating the monotonous transaction request is allocated with a unique portion of the aggregated transaction indexes, thereby ensuring time-order access to the at least one storage device in the DSS.

Certain exemplary embodiments also disclose a computing node for ensuring consistency in data updates transactions in a distributed storage system (DSS). The computing node comprises a processing unit; and a memory connected to the processing unit, the memory containing instructions that when executed by the processing unit, configure the computing node to: receive an aggregated transaction request comprising monotonous transaction requests, wherein each monotonous transaction request is initiated by at least a first computing node of a plurality of computing nodes in the DSS and includes monotonously increasing transaction indexes requested by the at least first computing node, wherein the plurality of computing nodes are arranged in a tree structure; generate a range of transaction indexes based on the aggregated transaction request, wherein each of the transaction indexes determines a time-order access to at least one storage device in the DSS by each of the plurality of computing nodes; pass the generated range of transaction indexes along the plurality of computing nodes according to their respective level in the tree structure hierarchy, wherein the at least first node is allocated with a unique portion of the aggregated transaction indexes, thereby ensuring time-order access to the at least one storage device in the DSS.

Certain exemplary embodiments further disclose a distributed storage system. The distributed storage system comprises at least one storage device; and a plurality of computing nodes communicatively connected to the at least one storage device, wherein one of the plurality of computing nodes is configured to operating as a root computing node, wherein the root computing node is further configured to: receive an aggregated transaction request comprising monotonous transaction requests, wherein each monotonous transaction request is initiated by at least a first computing node of the plurality nodes in the DSS and includes monotonously increasing transaction indexes requested by the at least a first computing node, wherein the plurality of computing nodes are arranged in a tree structure; generate a range of transaction indexes based on the aggregated transaction request, wherein each of the transaction indexes determines a time-order access to at least one storage device in the DSS by a computing node; and pass the generated range of transaction indexes along the plurality of computing nodes according to their respective level in the tree structure hierarchy, wherein each computing node initiating the monotonous transaction request is allocated with a unique portion of the aggregated transaction indexes, thereby ensuring time-order access to the at least one storage device in the DSS.

BRIEF DESCRIPTION OF THE DRAWINGS

The subject matter disclosed herein is particularly pointed out and distinctly claimed in the claims at the conclusion of the specification. The foregoing and other objects, features and advantages of the disclosed embodiments will be apparent from the following detailed description taken in conjunction with the accompanying drawings.

FIG. 3 is a flowchart describing a method for ensuring the consistency and completion of transactions in a DSS according to an embodiment.

DETAILED DESCRIPTION

Figure 1:
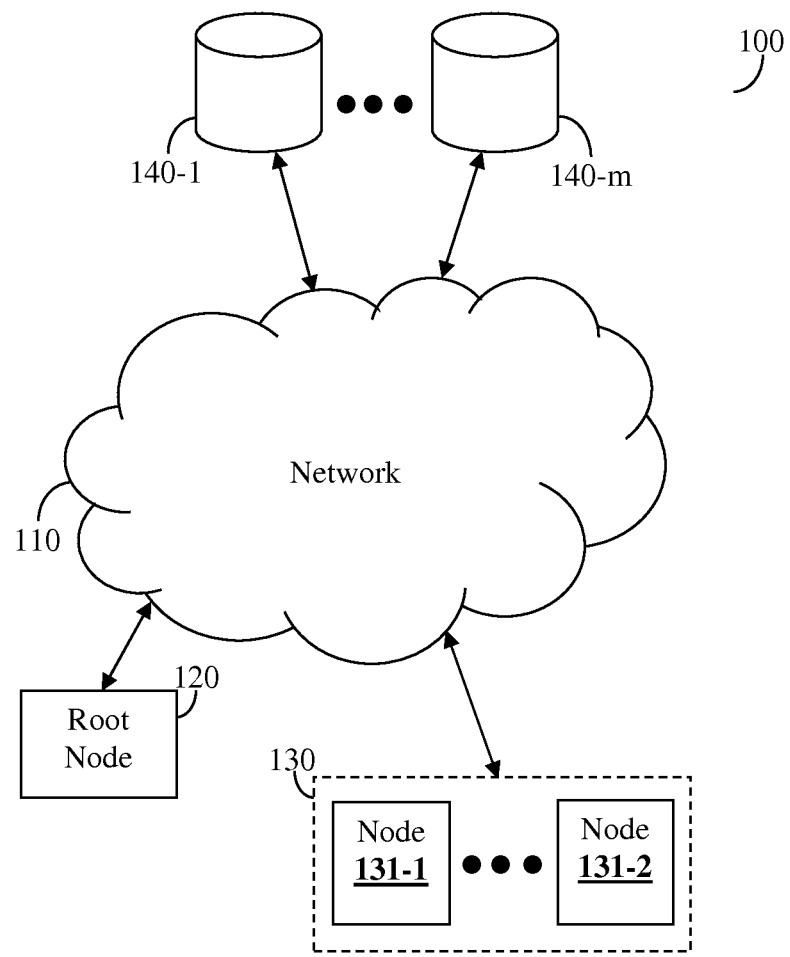
FIG. 1 is a schematic block diagram of a distributed storage system (DSS) utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

By way of example, some exemplary embodiments ensure consistency in data updates transactions in a distributed storage system (DSS). The disclosed embodiments are designed to maintain a certain time-order of access to storage devices by nodes. The time-ordered transaction processing is determined by a range of transaction indexes generated by a root node and communicate to the rest of the nodes in the DSS. The range of transaction indexes is generated in responses to requests from nodes other than the root node. To maintain transaction consistency the nodes in the DSS are arranged in a tree structure. Each node requesting an access to a storage device is assigned with a unique portion of the range of transaction indexes to the nodes. The portion of indexes is sent from the higher level node to a lower level node connected thereto in a hierarchy of the tree structure. As a result, an access to the storage device is performed one after the other respective of the portion of indexes received by the node being lower in the hierarchy.

FIG. 1 is an exemplary and non-limiting block diagram of a distributed storage system (DSS) 100 utilized to describe the transaction tracking being carried out according to some embodiments. The DSS 100 includes a root node 120 communicatively connected to a cluster of nodes 130.

The root node 120 and each one of the nodes, for example, node 131-1 and node 131-2 (collectively referred to hereinafter as nodes 131 or individually as a node 131, merely for simplicity purposes) in the cluster 130 may be communicatively connected to storage devices 140-1 through 140-$m$, where 'm' is an integer having a value of '1' or greater. Each node 131 in the cluster 130 may be any type of computing device that is configured to write/save data to the storage devices 140-1 through 140-$m$ and/or to read/retrieve data from the storage devices 140-1 through 140-$m$. A node 131 in the cluster 130 may be, but is not limited to, a cellular phone, a smartphone, a tablet computer, a notebook computer, a personal computer (PC), a laptop, a wearable computing device, or any other type of computing device. A storage device 140 may be, for example, a hard device, a redundant array of independent disks (RAID), a solid state drive (SSD), and the like. The storage devices 140-1 through 140-$m$ may be located in a storage network, a data center, a cloud computing infrastructure, and so on, and any combination thereof.

The storage devices 140, the cluster 130 of nodes 131 and the root node 120 are communicatively connected by a network 110. The network 110 may be a local area network (LAN), a wide area network (WAN), a metro area network (MAN), a cellular network, the worldwide web (WWW), the Internet, and the likes, implemented as wired and/or wireless networks, and any combinations thereof.

According to the disclosed embodiments, the root node 120 is configured to generate a range of transaction indexes for one or more nodes 131 in the cluster 130. The range of transaction indexes is generated in response to an aggregated transaction request received at the root node 120. The aggregated transaction request is an aggregation of monotonous increasing transaction indexes requests initiated by nodes 131 located at a lower level than the root node 120 in the nodes' hierarchy.

Specifically, a request to generate the range of transaction indexes can be initiated by any node 131 in the cluster 130. Such a request can be forwarded from one node 131 to another in the cluster 130 according to nodes' hierarchy in the cluster 130 until the request reaches the root node 120. The hierarchy is manifested in the structure of the cluster 130 of nodes 131, which is described in more detail herein below with respect to FIG. 2. The generated transaction indexes are provided back to the nodes 131 to ensure ordered access to one or more storage devices 140 by the nodes 131.

In an embodiment, a unique portion of the range of transaction indexes is provided to each node 131 initiating a request to perform an operation on a storage device 140. As such a node 131 can access a storage device 140 according to the order of the transaction index sets for the specific node 131. For example, if the range of transaction indexes is 1, 2, and 3, the node 131-1 may be assigned with transaction indexes 1 and 2, while transaction index 3 may be assigned to the node 131-2. A time-order access to the storage devices would be transactions 1 and 2 and then transaction 3. This ensures that transactions cannot be performed at the same time. Also, this ensures that if a certain transaction fails, it would be possible to recover the failed node.

Figure 2:
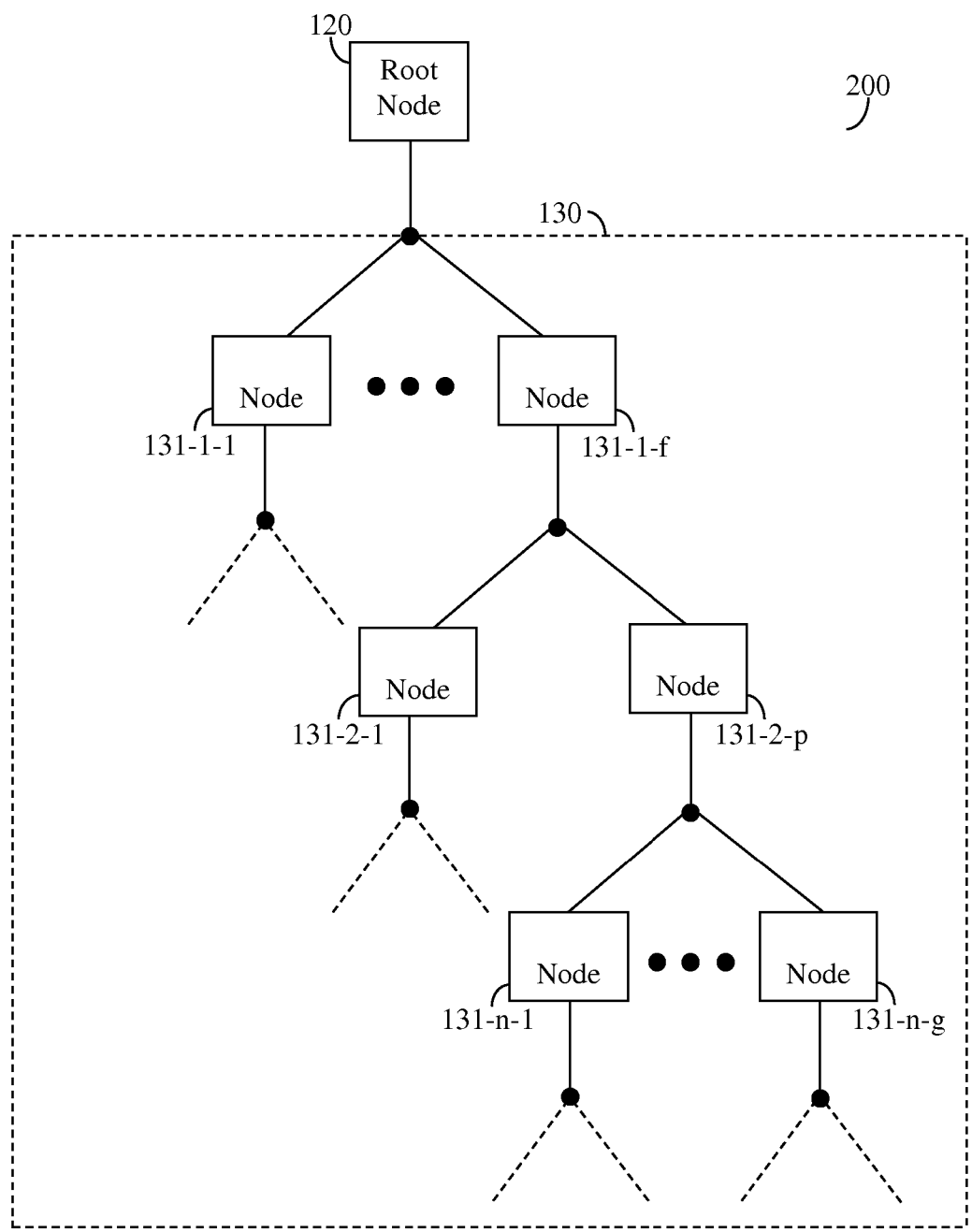
FIG. 2 is a schematic block diagram of a cluster of nodes in a DSS organized in a tree structure according to an embodiment.

FIG. 2 shows an exemplary and non-limiting block diagram of a tree structure 200 illustrating the hierarchy of nodes in a DSS according to an embodiment. One of the nodes is set to be a root node 120 while the other nodes 131 are arranged at different levels in a cluster 130. The order (or level) in the cluster 130 of nodes 131 may be arbitrary, based on a policy of the OS of each node 131 (e.g., one node in an organization may be determined to be a supervisor so it may have authority over all the rest nodes in the organization), user (e.g., an administrator of the DSS 100) configuration, and the like.

In an embodiment, only one node is determined to be the root node 120, which is the highest level in the hierarchy. Accordingly, the plurality of nodes 131 may be connected directly or indirectly via the hierarchy to the root node 120. It should be noted that also determination of which node is the root node 120 may be arbitrary, based on a policy of the OS of each node 131 (e.g., one node in an organization may be determined to be a supervisor so it may have authority over all the rest nodes in the organization), user (e.g., the administrator of the DSS 100) configuration, and the like.

According to some embodiments disclosed herein, the highest level nodes (other than the root node 120) are nodes 131-1-1 through 131-1-$f$ (collectively referred to as nodes 131-1) communicatively connected to the root node 120, where 'f' is an integer equal to '1' or greater. Each one of the nodes 131-1 may be communicatively connected to one or more nodes in the next level of the cluster 130, i.e., nodes 131-2-1 through 131-2-$p$ (collectively referred to as nodes 131-2) being lower in the hierarchy, where 'p' is an integer equal to '1' or greater. Similarly, each one of the nodes 131-2 may be also communicatively connected to one or more nodes being lower in the hierarchy, and therefore indirectly connected to the root node 120. For example, node 131-2-$p$ is connected to nodes 131-$n$-1 through 131-$n$-$g$, where 'g' is an integer equal to '1' or greater. The connectivity between the nodes can be facilitated through a network connection. The network can be any of a LAN, a WAN, a MAN, the Internet, a cellular network, and the like, implemented as wired and/or wireless networks.

FIG. 3 shows an exemplary and non-limiting flowchart 300 describing a method for ensuring the consistency in data updates transactions in a DSS (e.g., DSS 100) according to one embodiment. A transaction in the DSS is a sequence of data update operations performed by nodes (e.g., nodes 131) in a cluster (e.g., cluster 130) accessing at least one storage device (e.g., storage device 140). The method ensures a time-ordered transaction processing. Without limiting the scope of the disclosed embodiments, the method will be described with reference to FIGS. 1 and 2.

In S310, a request for monotonously increasing transaction indexes (referred hereinafter as a "monotonous transaction request") is received by a node from a lower-level node in the cluster 130. For example, a monotonous transaction request is received at node 131-2-$p$. Such monotonous transaction request can be sent from any of the nodes 131-$n$-1 through 131-$n$-$g$ communicatively connected to the node 131-2-$p$ and being lower in the hierarchy (see FIG. 2). According to one embodiment, the monotonous transaction request includes a request for permission to perform at least one transaction at a first time frame with respect to a storage device.

In S320, an aggregated request for transaction indexes (hereinafter an "aggregated transaction request") is generated by aggregating the monotonous transaction requests received during a predefined time interval by one node. For example, if the node 131-2-$p$ receives 10 monotonous transaction requests during the predefined time interval the aggregated transaction request contains 10 requests. As noted above, the monotonous transaction requests are received from nodes lower in the hierarchy. For example, an aggregated transaction request generated by the node 131-2-$p$ includes all monotonous transaction requests received from the nodes 131-$n$ trough 131-$n$-$g$ (collectively referred to as nodes 131-$n$). It should be noted that only monotonous transaction requests to perform a transaction during the same time frame (e.g., a first time frame) are aggregated.

In S330, it is checked whether the node generating the aggregated transaction request is a root node (e.g., root node 120). If so, execution continues with S350; otherwise, execution continues with S340, where the aggregated transaction request is sent towards the root node.

In S350, a range of transaction indexes is generated by the root node. The range of transaction indexes is comprised of unique monotonously increasing indexes. In an embodiment, the range of transaction indexes is generated based on the indexes included in the aggregated transaction request. It should be noted that the range of transaction indexes is for a transaction to be performed by the nodes on at least one storage device during a certain time frame. In S360, the generated range of transaction indexes is sent to the requesting node, for example node 131-2-$p$. As noted above, the transaction indexes are monotonously increased.

In S370, it is checked whether the transaction indexes are to be provided to one or more nodes lower in the hierarchy than the requesting node, e.g., nodes 131-$n$. If so, execution continues with S380; otherwise, execution terminates. The transaction indexes are provided to such nodes, if they initiated monotonous transaction requests to perform update operations on the storage devices 140.

In S380, each node (e.g., of nodes 131-$n$) initiating a monotonous transaction request is provided with a unique portion of the range of transaction indexes. The decision of which portion of the transaction indexes to provide to a child node is made by its parent node. The distribution of portions to two or more children nodes of the same parent may be arbitrary, based on a policy of the OS, or predefined configurations.

It should be emphasized that as the unique portion of indexes are sent from a parent node to child node according to the tree hierarchy, the permission to access the storage device is received from a node higher in the hierarchy. This ensures that the execution of transactions and therefore access to a storage device is performed in a time-ordered manner (respective of the portion of transaction indexes assigned to each node). Therefore, the disclosed techniques allow maintaining consistency in data updates transactions without having a centralized device (coordinator) that controls the access to the storage device.

Figure 4:
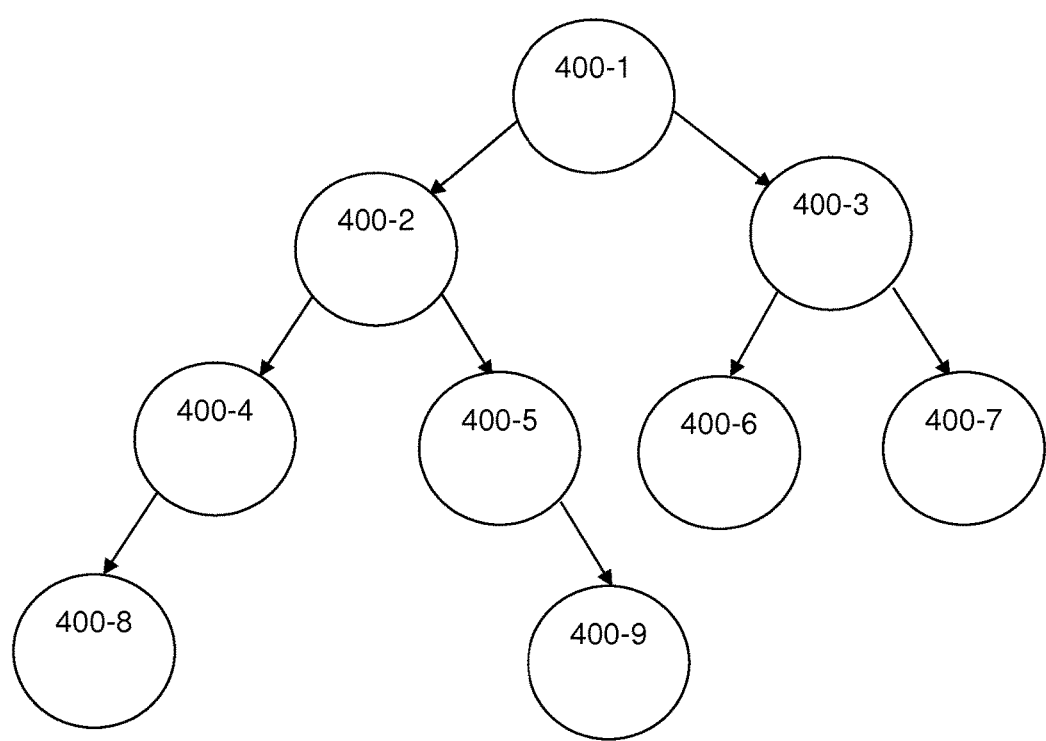
FIG. 4 is a schematic block diagram exemplifying the operation of the method ensuring the consistency and completion of transactions in a DSS according to an embodiment.

FIG. 4 is a schematic diagram illustrating the operation of the method discussed with reference to FIG. 3. According to this example, a node 400-4 receives 5 monotonous transaction requests from a node 400-8 communicatively connected to the node 400-4 and lower in the hierarchy. In this example, the node 400-4 aggregates the received 5 monotonous transaction requests into an aggregated transaction request which is then provided to the node 400-2. As noted in FIG. 2, node 400-2 is higher in the hierarchy.

A node 400-5 generates an aggregated transaction request aggregating 5 monotonous transaction requests received from a node 400-9. This aggregated transaction request is sent to the node 400-2. The node 400-2 is communicatively connected to the node 400-4 and the node 400-5 in a parent-children relationship.

The node 400-2 aggregates the received request and sends an aggregated transaction request consisting 10 monotonous transaction requests. The node 400-2 sends the aggregated requests to the node 400-1, being higher in the hierarchy and functions as a root node 410-1. The root node is arbitrary selected.

The node 400-1, which is the root node, generates locally a range of transaction indexes and later provides the range to the node 400-2. The range of transaction indexes includes the range of 1 to 10. The node 400-2 returns the range of 1 to 5 to the node 400-4 and the range of 6-10 to the node 400-5. It should be noted that transaction indexes determine the order that each node can execute its transactions. Thus, according to this example, the node 400-8 can execute the 5 first transactions (1-5), then node 400-9 can execute the next 5 transactions (6-10). This ensures that transactions cannot be performed at the same time. Also, this ensures that if a certain transaction fails, it would be possible to recover the failed node.

The embodiments disclosed herein can be implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

A person skilled-in-the-art will readily note that other embodiments may be achieved without departing from the scope of the disclosed invention. All such embodiments are included herein. The scope of the invention should be limited solely by the claims thereto.

What is claimed is:

1. A method for ensuring consistency in data updates transactions in a distributed storage system (DSS), comprising:

receiving, at a root computing node in the DSS, an aggregated transaction request comprising transaction requests, wherein each transaction request includes at least one operation of updating data in the DSS and wherein each transaction request is initiated by at least one computing node of a plurality of computing nodes in the DSS and wherein the root computing node and the plurality of computing nodes are arranged in a tree structure;

generating a range of increasing transaction indexes based on the aggregated transaction request, wherein each of the transaction indexes determines a time-order access to at least one storage device in the DSS by the at least one computing node of the plurality of computing nodes;

aggregating, by each computing node of the plurality of computing nodes directly connected to the root computing node, transaction requests received from nodes at a lower hierarchy, wherein the aggregation of transaction requests results with the aggregated transaction request;

sending the aggregated transaction request to the root computing node; and passing the generated range of transaction indexes along the plurality of computing nodes according to their respective level in the tree structure hierarchy, wherein each of the plurality of computing nodes initiating the transaction request is allocated with a unique portion of the aggregated transaction indexes, thereby ensuring time-order access to the at least one storage device in the DSS.

2. The method of claim 1, wherein the root computing node is a node in any computing node of the plurality of computing nodes selected to be at a higher hierarchy of the tree structure.

3. The method of claim 1, wherein the selection of the root computing node is based on at least one of: an arbitrary selection and a preconfigured policy.

4. The method of claim 3, wherein the range of transaction indexes further determines time-order access to the at least one storage device in the DSS during a time frame.

5. The method of claim 1, wherein each one of the plurality of computing nodes is a computing device including any one of: a cellular phone, a smartphone, a tablet device, a notebook computer, a personal computer (PC), a laptop, and a wearable computing device.

6. The method of claim 1, wherein the plurality of computing nodes, the root computing node, and the at least one storage device are communicatively connected by a network.

7. A non-transitory computer readable medium having stored thereon instructions for causing one or more processing units to execute the method comprising:

receiving, at a root computing node in the DSS, an aggregated transaction request comprising transaction requests, wherein each transaction request includes at least one operation of updating data in the DSS and wherein each transaction request is initiated by at least one computing node of a plurality of computing nodes in the DSS and wherein the root computing node and the plurality of computing nodes are arranged in a tree structure;

generating a range of increasing transaction indexes based on the aggregated transaction request, wherein each of the transaction indexes determines a time-order access to at least one storage device in the DSS by the at least one computing node of the plurality of computing nodes;

aggregating, by each computing node of the plurality of computing nodes directly connected to the root computing node, transaction requests received from nodes at a lower hierarchy, wherein the aggregation of transaction requests results with the aggregated transaction request;

sending the aggregated transaction request to the root computing node; and passing the generated range of transaction indexes along the plurality of computing nodes according to their respective level in the tree structure hierarchy, wherein each of the plurality of computing nodes initiating the transaction request is allocated with a unique portion of the aggregated transaction indexes, thereby ensuring time-order access to the at least one storage device in the DSS.

8. A distributed storage system, comprising:

at least one storage device; and a plurality of computing nodes communicatively connected to the at least one storage device, wherein one of the plurality of computing nodes is configured to operate as a root computing node, wherein the root computing node is further configured to:

receive an aggregated transaction request comprising transaction requests, wherein each transaction request includes at least one operation of updating data in a distributed storage system (DSS) and wherein each transaction request is initiated by at least a first computing node of the plurality of computing nodes in the DSS and wherein the plurality of computing nodes are arranged in a tree structure;

generate a range of increasing transaction indexes based on the aggregated transaction request, wherein each of the transaction indexes determines a time-order access to at least one storage device in the DSS by a computing node;

aggregate, by each computing node of the plurality of computing nodes directly connected to the root computing node, transaction requests received from nodes at a lower hierarchy, wherein the aggregation of transaction requests results with the aggregated transaction request;

send the aggregated transaction request to the root computing node; and pass the generated range of transaction indexes along the plurality of computing nodes according to their respective level in the tree structure hierarchy, wherein each computing node initiating the transaction request is allocated with a unique portion of the aggregated transaction indexes, thereby ensuring time-order access to the at least one storage device in the DSS.

9. The distributed storage system of claim 8, wherein the root computing node is any computing node of the plurality of computing nodes selected to be at a higher hierarchy of the tree structure.

10. The distributed storage system of claim 8, wherein the selection of the root node is based on at least one of: an arbitrary selection and a preconfigured policy.

11. The distributed storage system of claim 8, wherein the range of transaction indexes further determines time-order access to the at least one storage device in the DSS during a time frame.

12. The distributed storage system of claim 8, wherein each one of the plurality of computing nodes is a computing device including any one of: a cellular phone, a smartphone, a tablet device, a notebook computer, a personal computer (PC), a laptop, and a wearable computing device.

13. The distributed storage system of claim 8, wherein the plurality of computing nodes and the at least one storage device are communicatively connected by a network.

* * * * *